United States Patent [19]

Staley

[11] Patent Number: 4,778,028

[45] Date of Patent: Oct. 18, 1988

[54] LIGHT VISCOELASTIC DAMPING STRUCTURE

[75] Inventor: James A. Staley, Media, Pa.

[73] Assignee: General Electric Company, King of Prussia, Pa.

[21] Appl. No.: 926,224

[22] Filed: Nov. 3, 1986

[51] Int. Cl.$^4$ ............................................. F16F 15/00
[52] U.S. Cl. ..................................... 181/208; 181/288; 181/290; 181/294
[58] Field of Search ................................. 181/207–209, 181/292, 288, 202, 290, 294

[56] References Cited

U.S. PATENT DOCUMENTS

| | | | |
|---|---|---|---|
| 1,819,665 | 8/1931 | Wiltse . | |
| 2,195,041 | 3/1940 | Von Schlippe . | |
| 2,882,747 | 4/1959 | Haushalter | 74/574 |
| 3,087,565 | 4/1963 | Kerwin, Jr. | 181/208 |
| 3,087,571 | 4/1963 | Kerwin, Jr. | 181/208 |
| 3,087,573 | 4/1963 | Ross | 181/208 |
| 3,160,549 | 12/1964 | Caldwell et al. | 181/207 X |
| 3,173,514 | 3/1965 | Tiedemann | 188/1 |
| 3,334,886 | 8/1967 | Caunt | 267/1 |
| 3,388,772 | 6/1968 | Marsh et al. | 188/1 |
| 3,402,560 | 9/1968 | Alm | 61/53 |
| 3,419,111 | 12/1968 | Jones et al. | 188/1 |
| 3,863,881 | 2/1975 | Fletcher et al. | 248/358 R |
| 4,133,157 | 1/1979 | Bschorr et al. | 52/403 |
| 4,195,713 | 4/1980 | Hagbjer et al. | 188/1 B |
| 4,241,806 | 12/1980 | Metzger | 181/292 X |
| 4,308,308 | 12/1981 | Sachse | 181/294 X |
| 4,338,758 | 7/1982 | Hagbjer | 52/742 |
| 4,453,693 | 6/1984 | Krux | 248/559 |

Primary Examiner—Benjamin R. Fuller
Attorney, Agent, or Firm—Clement A. Berard, Jr.; Raymond E. Smiley

[57] ABSTRACT

A light viscoelastic damping structure has a plurality of damping strips widely separated on the surface of a lightweight panel. The strips may be arranged parallel or at right angles to each other. Each damping strip includes a viscoelastic damping layer, a first honeycomb structure having opposing face sheets and attached to one surface of the damping layer, and a second honeycomb structure having face sheets on opposing sides thereof attached to the damping layer and to the panel.

8 Claims, 2 Drawing Sheets

LIGHT VISCOELASTIC DAMPING STRUCTURE

BACKGROUND OF THE INVENTION

The Government has rights in this invention pursuant to Contract No. F33615-82-C-3223 awarded by the United States Air Force.

The present invention relates generally to structures for damping panels subject to vibration environments and more specifically to structures for damping vibrations in satellite equipment panels.

Over the years, many techniques have been proposed for damping the vibrations induced in panels housed in equipment subject to vibration environments, such as automotive, railroad, aircraft or space vehicles. These vibrations can result in parts fatiguing and sensitive equipment failing.

U.S. Pat. No. 3,087,571 discloses the damping of vibrations induced in panels by the use of a viscoelastic damping layer in conjunction with a constraining layer and a spacer layer. A wide variety of geometrical arrangements of these elements and of their relative dimensions thereof can be designed.

U.S. Pat. No. 3,087,573 is an improved version of the arrangement shown in U.S. Pat. No. 3,087,571. This patent discloses the optimal geometric arrangement of the viscoelastic damping layer, constraining layer and spacer layer; the optimal dimensions of each layer relative to the damped surface are provided such that the lightest weight design is obtained for a desired amount of damping.

For space applications, however, any added weight is costly. Although U.S. Pat. No. 3,087,573 discloses a light weight damping structure, it still produces significant added weight which is a penalty for space applications. In addition the prior art fails to teach selective covering of the panel surface. Common applications of the prior art involve covering the entire surface to be damped. In many applications, however, large areas of both sides of the panel to be damped must be left exposed for mounting components and to permit components mounted thereon, to cool.

OBJECTS OF THE INVENTION

Accordingy, it is an object of the present invention to provide a new and improved damping structure which provides damping of panels with as little weight penalty as possible.

It is a further object of this invention to provide a damping structure which provides selective damping without covering the entire panel surface.

These and other objects of the invention will become apparent from the following drawings and specification.

SUMMARY OF THE INVENTION

According to a broad aspect of the invention, the damping or reinforcing structure is applied to a panel or other similar type surface which is subject to low frequency vibrations. This damping structure is comprised of a viscoelastic damping layer, means for constraining the upper surface of the damping layer and means for stiffening the reinforcing structure. The stiffening means is bonded between the panel and the lower surface of the damping layer. The constraining means is bonded to the upper surface of the damping layer.

The constraining means consists of a first honeycomb structure with a first face sheet bonded to one side of the first honeycomb structure. The opposite side of the first honeycomb structure may be bonded directly to the upper surface of the damping layer, or it may be bonded to a very thin second face sheet which is then bonded to the damping layer. The stiffening means may consist of a second honeycomb structure with one surface of a third face sheet bonded to one side of the second honeycomb structure. The other surface of the third face sheet is bonded to the lower surface of the damping layer. The opposite side of the second honeycomb structure may be bonded directly to the panel, or it may be bonded to very thin fourth face sheet which is then bonded to the panel.

The reinforcing structure may be applied to the panel in the form of one or more strips so as to leave large areas of the panel exposed to allow for cooling of components to be mounted thereon.

In accordance with another aspect to the invention, the panel may be constructed from a honeycomb structure and two face sheets to create a stiff panel member, thereby eliminating the need for a stiffening means. The constraining means and damping layer are constructed as previously described. The honeycomb structure has one side bonded to one side of one face sheet, and the other side of said face sheet is bonded to the lower surface of the damping layer. The other side of the honeycomb structure is bonded to one side of the other face sheet. This eliminates the weight of the stiffening means and utilizes a lighter weight panel than a standard solid metal panel.

The damping layer and constraining means may be applied to the stiff panel member in the form of one or more strips so as to leave large areas of the panel exposed for cooling purposes as previously noted.

BRIEF DESCRIPTION OF THE DRAWINGS

FIG. 2 is a sectional view taken along lines 2—2 of FIG. 1a.

FIG. 3 is a sectional view of an alternate form of the invention taken along lines 2—2 of FIG. 1a.

DETAILED DESCRIPTION OF THE INVENTION

Figure 1A:
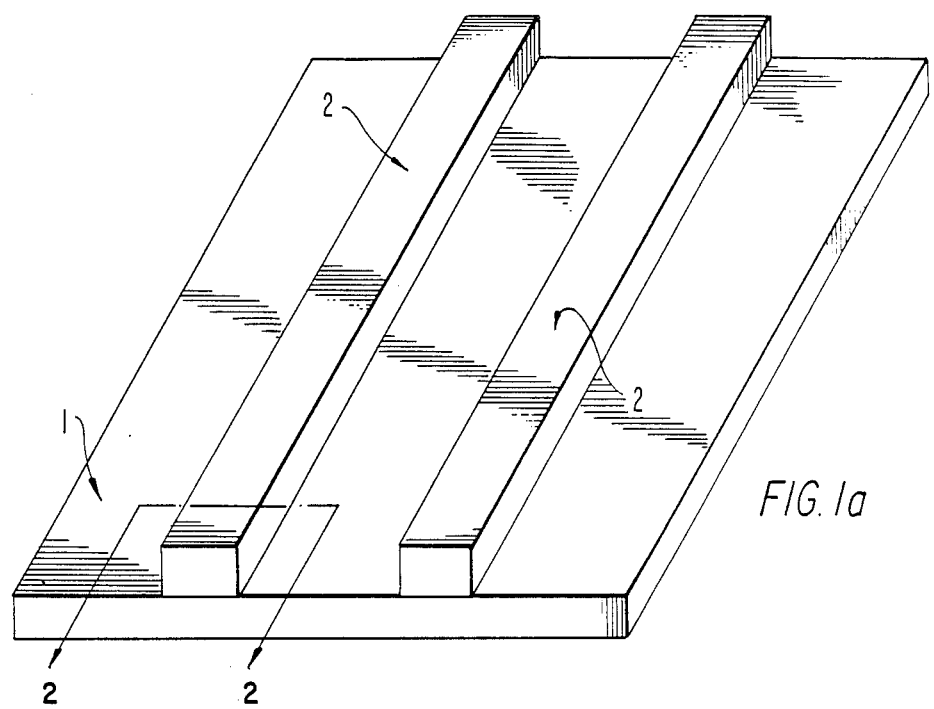
FIG. 1a is a perspective view showing an embodiment of the invention wherein the reinforcing structure is selectively applied in the form of a plurality of strips arranged in parallel.
Figure 2:
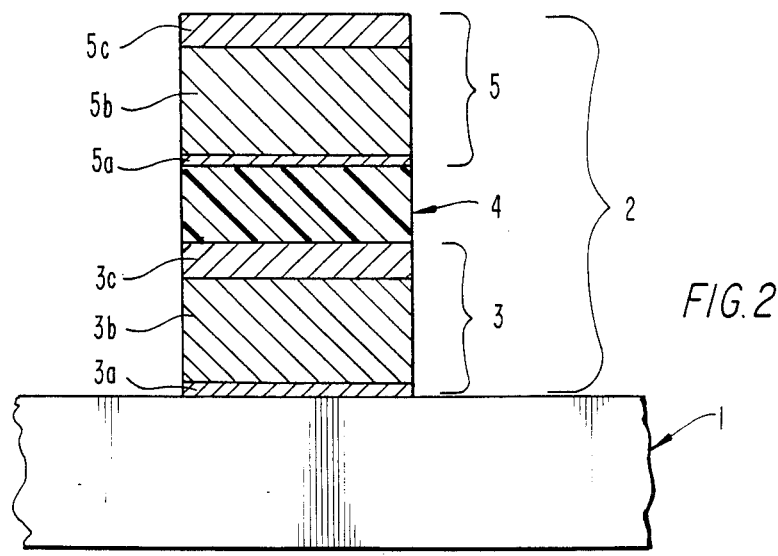

The invention will be described with reference to the embodiments shown in the drawings. Referring to FIGS. 1a and 2, a damping or reinforcing structure 2 is bonded to a panel or other similar type structure 1 which is subject to low frequency vibrations (0 to 500 Hz). Said damping structure 2 comprises a viscoelastic damping layer 4, means 5 for constraining the upper surface of damping layer 4, and means 3 for stiffening panel 1. Stiffening means 3 has one of its sides bonded to panel 1 and its opposite side bonded to the lower surface of damping layer 4. Constraining mens 5 is bonded to the upper surface of damping layer 4. Suitable materials for use as the viscoelastic damping layer include SMRD100F90, manufactured by General Electric Company. Other viscoelastic materials manufactured by General Electric such as SMRD100B50 might also be used. Viscoelastic materials such as 3M ISD 112, manufactured by 3M; or DYAD 601, manufactured by Soundcoat Corporation might be used in some applications. The specific material to be used must be evaluated on a case-by-case basis.

Constraining means 5 consists of a first honeycomb structure 5b, such as aluminum, with a first face sheet 5c, such as aluminum or graphite epoxy, bonded to one side of first honeycomb structure 5b. The opposite side of first honeycomb structure 5b may be bonded directly to the upper surface of damping layer 4, or it may be bonded to a very thin second face sheet 5a which is then bonded to damping layer 4. Second face sheet 5a is used to facilitate bonding of constraining means 5 to damping layer 4. First face sheet 5c and second face sheet 5a are of the same material for thermal considerations during fabrication and satellite operation. The thicknesses of first honeycomb structure 5b and first face sheet 5c are selected to achieve the desired constraint while using the lightest weight means 5 possible.

Stiffening means 3 may take several forms but typically consists of a second honeycomb structure 3b, such as aluminum, with one surface of a third face sheet 3c, such as aluminum, bonded to one side of the second honeycomb structure 3b. The other surface of third face sheet 3c is bonded to the lower surface of damping layer 4. The opposite side of second honeycomb structure 3b may be bonded directly to panel 1, or it may be bonded to a very thin fourth face sheet 3a which is then bonded to panel 1. Fourth face sheet 3a is used to facilitate bonding of stiffening means 3 to panel 1. Third face sheet 3c and fourth face sheet 3a are of the same material for thermal considerations during fabrication and satellite operation. Based on thermal considerations, the material used for fourth face sheet 3a is also the same as that used for panel 1. The thicknesses of second honeycomb structure 3b and third face sheet 3c are selected to achieve the desired stiffness using the lightest weight stiffening means 3 possible.

Figure 1B:
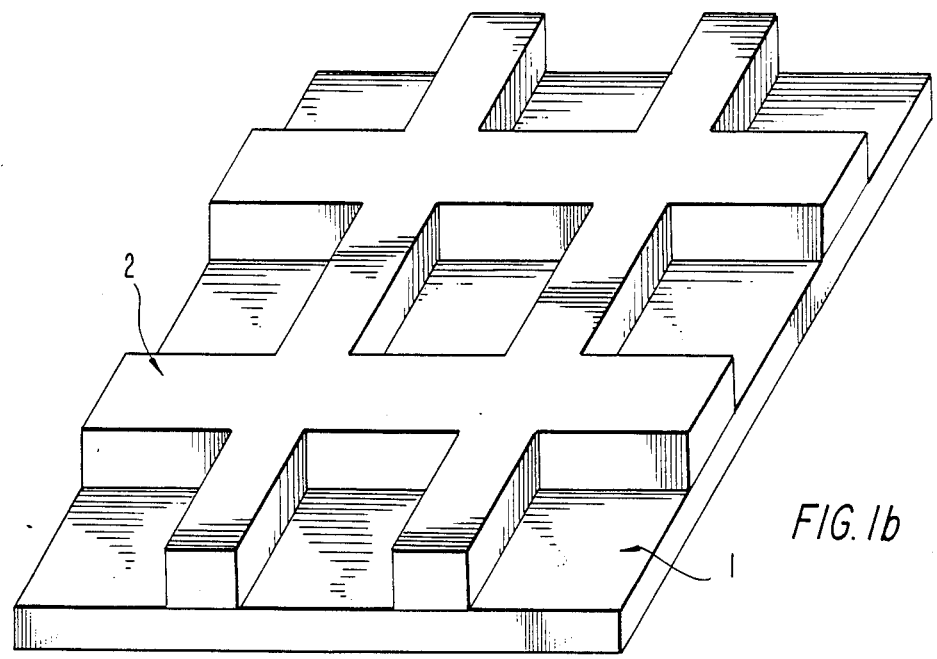
FIG. 1b is a perspective view showing an embodiment of the invention wherein the reinforcing structure is selectively applied in the form of a plurality of strips arranged at right angles in a criss-cross pattern.

Although reinforcing structure 2 may be applied to the entire surface of panel 1, if weight considerations are not critical, a significant weight reduction can be achieved by selectively applying reinforcing structure 2 to a small area of the surface of panel 1 leaving most of that surface free for mounting equipment and the other surface completely free, for example, for heat dissipation. Keeping a maximum surface area available for mounting equipment and for thermal considerations is extremely important in satellite applictions. Typically, reinforcing structure 2 is applied to panel 1 in the form of one or more strips. These strips may be arranged in various configurations but are preferably arranged in parallel (FIG. 1a) or at right angles to one another in a "criss-cross" pattern (FIG. 1b).

In satellites, two types of undesirable vibrations are of primary concern. The first type is quasi-static vibrations which consist of a nearly steady (zero frequency) acceleration plus a very low frequency transient (typically 2 to 5 Hz). The second type is low frequency vibroacoustic vibrations (typically 50 to 500 Hz) induced by the acoustic pressures often associated with the propulsion system for launching a satellite into orbit. Panel 1 and stiffening means 3 together provide enough stiffness to limit deflections due to quastatic vibrations. Furthermore, the stiffness increases the fundamental natural frequency (first mode) of the panel to a large enough value (typically about 50 Hz) to place it out of the range where amplification of low frequency vibration might occur. Damping layer 4 and constraining means 5 limit the low frequency vibroacoustic vibrations. The lower surface and interior portions of damping layer 4 deform in response to low frequency vibroacoustic vibrations. The upper surface of damping layer 4, however, remains essentially unchanged due to the constraint imposed by constraining means 5. The result is a shear strain concentrated in damping layer 4 and a buildup of strain energy in the viscoelastic material during each panel oscillation. The viscoelastic material of damping layer 4 dissipates vibratory energy in proportion to its strain energy. A portion of the vibratory energy is converted to heat in the viscoelastic material, thereby damping the low frequency vibroacoustic vibrations. The net result is effective damping over a frequency range of 0 to 500 Hz when the damping and reinforcing structures are properly designed. A significant amount of damping can also be expected for frequencies beyond 500 Hz.

The weight penalty traditionally associated with prior effective damping configurations is minimized using two technqiues. The first technique is to construct stiffening means 3 and constraining means 5 from a combination of a light weight honeycomb structure and a strong face sheet and then to adjust the geometry of the two materials to obtain the desired structural qualities with the least weight penalty. The geometric sizing is done using a NASTRAN computer simulation which is based on a finite element model of the damped panel. The Modal Strain Energy Method is used to estimate damping provided by a damped panel design. A detailed understanding of these procedures can be obtained from the following references: Klaus-Jergen Bathe, *Finite Element Procedures in Engineering Analysis,* Prentice Hall, 1982; *MSC/NASTRAN User's Manual,* the McNeil Schwendler Corporation; L. C. Rogers, C. Johnson, and D. A. Keinholtz, *"Finite Element Predictions of Damping in Beams with Constrained Viscoelastic Layers,"* Proceedings of 22nd Structural Dynamics and Materials Conference, 1981. Parametric variations are made in geometry, typically the thicknesses, and material properties about a preliminary design until the minimum weight for given damped panel design requirements is achieved.

The second technique is to design an integrally damped panel. This design technique takes into account not only the reduction in vibroacoustic load due to damping, but also the damping structure's load carrying capability. Thus, a thinner and, hence, lighter weight panel 1 can be used while still maintaining a structural integrity equal to that of a thicker undamped panel. This is possible because of the added structural integrity provided by the stiffnesses of stiffening means 3 and constraining means 5. Stiffening means 3 enables the damping structure 2 to carry part of the structural load. Together, these techniques yield an effectively damped panel with a minimum weight penalty as compared to an undamped panel.

As a specific example, a damping structure was designed for a communication satellite equipment panel, and a test was performed. The undamped baseline test panel was constructed to closely simulate an actual undamped panel to be installed in a communications satellite. The actual undamped panel was approximately 27 inches square, constructed of a solid metal plate and contained 2 integrally milled/riveted stiffeners. Three travelling wave tube amplifiers (TWTAs) were mounted on it along with associated wave guides and electronics. These TWTAs placed a severe design restraint on the actual undamped panel because the thermal requirement to dissipate their generated heat made the use of a light-weight honeycomb structure for the base panel impractical. Hence, a solid metal panel was required for thermal, not structural reasons.

The undamped test panel consisted of a solid aluminum plate, three TWTA simulators, and two aluminum hat section stiffeners in lieu of the integrally milled/riveted stiffeners. The aluminum plate and two aluminum hat section stiffeners simulated the stiffness of the actual undamped panel. The TWTA simulators were each made of an aluminum block mounted on a steel plate. They provided the total weight and center of gravity of the actual TWTAs and other components necesssary to make the total weight of the undamped test panel equal to that of the actual undamped panel. The damped panel was designed as shown in FIG. 2. Referring to FIGS. 1b and 2, reinforcing structure 2 was applied in 4 strips arranged at right angles in a "criss-cross" pattern on an aluminum panel 1. The stiffening means 3 consisted of a 0.4 inch thick Hexcel 1/8-5052-.002 aluminum honeycomb structure 3b with a lower face sheet 3a of 5 mil thick aluminum and an upper face sheet 3c of 30 mil aluminum. Damping layer 4 was a 0.25 inch thick layer of General Electric's SMRD 100F90B, a viscoelastic damping material. Constraining means 5 consisted of a 0.4 inch thick Hexcel 1/8-5052-.002 aluminum honeycomb structure 5b with a lower face sheet 5a of 5 mil uniaxial HMS/CE339 graphite epoxy and an upper face sheet 5c of 80 mil uniaxial HMS/CE339 graphite epoxy. The design provided a minimum loss factor of 0.3 in the fundamental mode and 0.1 for all important modes below 500 Hz. Table 1 shows that the damping was achieved with no weight penalty. In fact, for this particular case, a weight reduction was realized.

TABLE 1

| PANEL DESIGN | DESIGN WEIGHT SUMARY | | | | | |
|---|---|---|---|---|---|---|
| | DAMPING/ STIFFENER | | PANEL | | PANEL & DAMPING/ STIFFENER | |
| | LB | % | LB | % | LB | % |
| UNDAMPED PANEL | 0.86 | 100 | 7.62 | 100 | 8.48 | 100 |
| DAMPED PANEL | 0.72 | 84.0 | 7.62 | 100 | 8.34 | 98.3 |

NOTE:
The undamped panel included a stiffener. Without the stiffener, a thicker and heavier panel would have been required to yield the same structural integrity.

Figure 3:
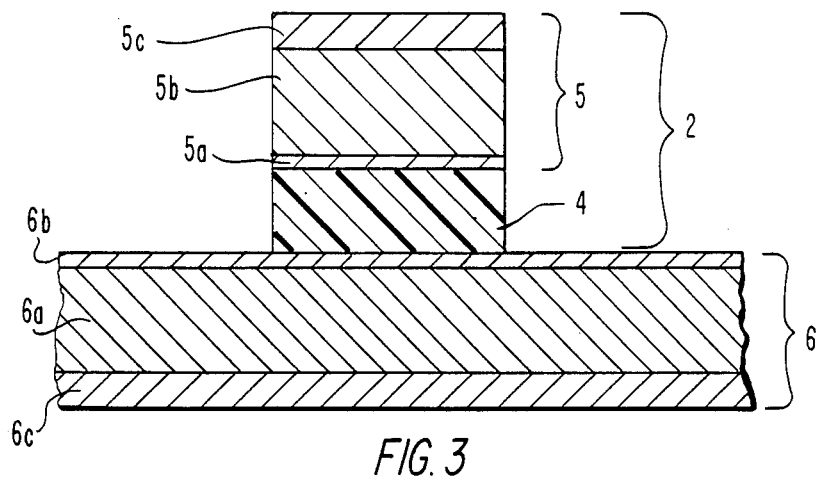

Referring now to FIGS. 1a, 2 and 3, further weight reductions can be achieved by constructing the panel from a honeycomb structure 6a and two face sheets, 6b and 6c, to create a stiff panel member 6, thereby eliminating the need for stiffening means 3. One side of the honeycomb structure 6a is bonded to one side of face sheet 6b, and the other side of face sheet 6b is bonded to the lower surface of damping layer 4. The other side of honeycomb structure 6a is bonded to one side of face sheet 6c. All three elements 6a, 6b and 6c and typically aluminum. The thicknesses of face sheet 6c is much greater than that of face sheet 6b to yield the stiffest possible structure. This arrangement eliminates the weight of stiffening means 3 and utilizes a lighter weight panel than the standard solid metal panel.

Damping layer 4 and constraining means 5 may be applied to the entire surface of the stiff panel member 6 where weight and other considerations are not critical. A significant weight reduction can be achieved by selectively applying damping layer 4 and constraining means 5 to a small area of the surface of stiff panel member 6 leaving most of that surface free for mounting equipment and the other surface completely free. Typically, damping layer 4 and constraining means 5 are applied to the panel in the form of one or more strips 2. As with respect to the discussion of FIG. 2, these strips 2 may be arranged in various configurations but are preferably arranged in parallel (FIG. 1a) or at right angles to one another in a "criss-cross" pattern (FIG. 1b).

Replacing the solid metal panel and constraining means with the above mentioned stiff panel member, however, is not always a viable alternative. Many applications require that the panel have specific properties not inherent in a honeycomb/face sheet construction (e.g. thermal conductivity). For these applications the damping structure of FIG. 2 is preferred.

While the invention has been particularly shown and described with respect to several preferred embodiments thereof, it will be understood by those skilled in the art the various changes in form and detail may be made therein without departing from the spirit and scope of the invention as defined by the appended claims.

What is claimed is:

1. In combination, a panel and a structure thereon for reducing vibrations, said structure comprising:
   a plurality of damping strips on said panel and widely separated from each other so as to leave large areas of the panel exposed, each damping strip comprising:
   a viscoelastic damping layer having upper and lower surfaces;
   means for constraining movement of the upper surface of said damping layer, said means for constraining movement including a first honeycomb structure, a first face sheet attached to one side of said first honeycomb structure and a second face sheet attached to the other side thereof, and means for attaching the opposite side of said second face sheet to said upper surface of said damping layer; and
   stiffening means for providing static bending stiffness to the panel structure, said stiffening means positioned between said lower surface of said damping layer and a surface of said panel and including a second honeycomb structure, a third face sheet attached to one side of said second honeycomb structure and to said lower surface of said damping layer, and means for attaching the opposite side of said second honeycomb structure to said surface of said panel, said second face sheet and said second honeycomb structure being of appropriate thicknesses to substantially increase the natural frequency of the panel;
   whereby the structural deflection of said panel is decreased and the damping and natural frequency of said panel are increased.

2. The invention as defined in claim 1 wherein said plurality of strips are arranged in parallel.

3. The invention as defined in claim 1 wherein said plurality of strips are arranged at right angles in a criss-cross pattern.

4. The invention as defined in claim 1 wherein said means for attaching said opposite side of said second honeycomb structure to said surface of said panel includes a fourth face sheet of minimum thickness interposed between said second honeycomb structure and said panel.

5. An improved vibration damped panel comprising:
a stiff lightweight panel,
a damping structure on said panel comprising:
a plurality of damping strips widely spaced from each other so as to leave large areas of said stiff lightweight panel exposed, said damping strips including:
a viscoelastic damping layer having upper and lower surfaces and means for constraining movement of the upper surface of said damping layer, said means for constraining movement including a first honeycomb structure, a first face sheet attached to one side of said first honeycomb structure, and means for attaching the opposite side of said first face sheet to the upper surface of said damping layer; and
a second honeycomb structure, a second face sheet, and a third face sheet, one side of said second face sheet attached to one side of said second honeycomb structure and the opposite side of said second face sheet attached to the lower surface of said damping layer, the opposite side of said second honeycomb structure attached to one side of said third face sheet and the opposite side of said third face sheet attached to said stiff lightweight panel, said second honeycomb structure, said second face sheet, and said third face sheet being of appropriate thickness to provide static bending stiffness to said panel and increase the natural frequency of the panel;
whereby the structural integrity and vibration damping potential of said panel is enhanced.

6. The damped panel as defined in claim 5 wherein said plurality of strips are arranged in parallel.

7. The damped panel as defined in claim 5 wherein said plurality of strips are arranged at right angles in a criss-cross pattern.

8. The damped panel as defined in claim 5 further including a fourth face sheet attached to the side of said first honeycomb structure opposite that to which said first face sheet is attached.

* * * * *